US012708120B2

(12) United States Patent
Ruhe et al.

(10) Patent No.: US 12,708,120 B2
(45) Date of Patent: Aug. 18, 2026

(54) SHEETER WITH PIVOTABLE FEED SYSTEM

(71) Applicant: J.C. Ford Company, Columbia, TN (US)

(72) Inventors: Scott D. Ruhe, Yorba Linda, CA (US); Steven Andrew King, Taylorsville, UT (US)

(73) Assignee: J.C. Ford Company, Columbia, TN (US)

( * ) Notice: Subject to any disclaimer, the term of this patent is extended or adjusted under 35 U.S.C. 154(b) by 81 days.

(21) Appl. No.: 18/671,629

(22) Filed: May 22, 2024

(65) Prior Publication Data

US 2024/0389605 A1 Nov. 28, 2024

Related U.S. Application Data

(60) Provisional application No. 63/503,573, filed on May 22, 2023.

(51) Int. Cl.
*A21C 3/02* (2006.01)
*A21C 3/04* (2006.01)
*A23P 30/20* (2016.01)

(52) U.S. Cl.
CPC ................ *A21C 3/024* (2013.01); *A21C 3/02* (2013.01); *A21C 3/04* (2013.01); *A23P 30/20* (2016.08)

(58) Field of Classification Search
CPC .. A21C 3/02; A21C 3/024; A21C 3/04; A23P 30/20; A22C 7/0069
See application file for complete search history.

(56) References Cited

U.S. PATENT DOCUMENTS 1,302,053 A * 4/1919 Jameson .................. A21C 3/02 198/540
3,161,157 A * 12/1964 Ruhe ...................... A21C 11/16 425/437
4,913,645 A * 4/1990 Daouse .................... A21C 3/08 425/150
11,406,108 B1 * 8/2022 Alatorre ................. A21C 11/10
2006/0222749 A1 * 10/2006 Ruhe ........................ A21C 3/02 426/502
2008/0072771 A1 * 3/2008 Marchl .................... A21C 9/04 99/494
2012/0225151 A1 * 9/2012 Ruhe ...................... A21C 3/021 425/150
2021/0298314 A1 * 9/2021 Ruhe ...................... A21C 11/04
2022/0039398 A1 * 2/2022 Ancona .................. A21C 3/024

* cited by examiner

*Primary Examiner* — Seyed Masoud Malekzadeh
(74) *Attorney, Agent, or Firm* — Knobbe, Martens, Olson & Bear, LLP

(57) ABSTRACT

A masa processing system can include a sheeter and a pivotable support assembly. The sheeter can be configured to receive a feed of masa. The pivotable support assembly can include a post having a lower fixed end and an upper end and a pivotable assembly coupled with the upper end of the post. The pivotable assembly can include a pivot member rotatably coupled with the post and being pivotable about a vertical axis and a transverse support having a first end coupled with the pivot member and a second end opposite the first end. The pivotable support assembly can be configured to rotate about the vertical axis between a first position in which the second end of the transverse support is disposed over the sheeter and a second position in which the second end of the transverse support is disposed away from the sheeter.

13 Claims, 13 Drawing Sheets

SHEETER WITH PIVOTABLE FEED SYSTEM

PRIORITY INFORMATION

Any and all applications for which a foreign or domestic priority claim is identified in the Application Data Sheet as filed with the present application are hereby incorporated by reference under 37 C.F.R. § 1.57.

This application claims the benefit of U.S. Provisional Patent Application No. 63/503,573, filed May 22, 2023, the entire contents of which is hereby incorporated by reference in its entirety.

BACKGROUND

Field

The disclosure relates to improvements in high speed production sheeting systems and devices for comestible products (e.g., tortillas and tortilla chips). More specifically, the disclosure relates to pivotable feed systems for sheeting devices.

Related Art

Corn tortillas and tortilla chips are cut from a sheet of corn dough, called “masa,” and then baked and/or fried. In masa production, the sheeting and cutting stages are accomplished by a tortilla sheeter.

High production tortilla sheeters receive a feed of masa from a source of masa via a conduit system. The conduit system includes a nozzle to direct the feed of masa into the sheeter’s hopper and between a pair of large, stainless steel rollers which roll the masa into a sheet of substantially uniform thickness. The rollers are spaced apart in production to form a gap, known as a “pinch point gap,” through which the masa passes. The masa adheres to the surface of one of the rollers, known as the exit roller, after passing through the pinch point gap. A third roller then cuts the masa into either tortillas or tortilla chips. The third roller, known as the cutting roller, commonly has either circular shaped (for tortillas) or triangular-shaped (for tortilla chips) cutting guides positioned on the cylindrical external surface of the cutting roller. The cut tortillas or chips then are stripped from the exit roller by a stripper wire and/or a blower, or by a similar device.

SUMMARY

Various systems, methods, and devices are disclosed for providing a pivotable feed system for a tortilla sheeter. Other systems, methods, and devices are disclosed for providing a crane system combined with a support for a feed conduit of a tortilla sheeter. Some systems, methods, and devices are disclosed for providing a pivotable feed system for a tortilla sheeter combined with a crane system. The systems, methods, and devices of the disclosure each have several innovative aspects, no single one of which is solely responsible for the desirable attributes disclosed herein.

There is a need for a masa processing system that can be used to evacuate a feed system during masa and tortilla production without requiring the sheeters to be moved away from the feed system. Sheeters can be large units that can weigh approximately 15,000 pounds or heavier and can be 10-15 feet tall or taller. Generally, the sheeter receives a flow of masa from an elevated feed system that delivers a flow of masa from a masa source system. The feed system and sheeter may operate for long periods of time (e.g., multiple days) without stops in production. The sheeter may receive approximately 3000 to 6000 pounds of masa per hour from the feed system. As part of a quality control procedure associated with food production, the feed system may be evacuated one or more times per week. Evacuation of the feed system involves pumping the flow of masa into a waste facility for a period of time (e.g., for 20 minutes or more). Traditional feed systems are in a fixed position in the food production facility. As a result, to facilitate an evacuation of the feed system, the sheeter must be moved away from the feed system and container may be brought in to receive the waste masa. Because of the large size of the sheeters, moving a sheeter for an evacuation involves considerable effort and time. Any additional time spent moving the sheeter for an evacuation is time where the sheeters are not in production. Additionally, moving sheeters can require additional safety precautions to protect operators.

In order to improve the evacuation procedure of the feed system without requiring movement of the sheeter, a pivotable feed system can be utilized. The pivotable feed system can be supported by a pivotable support assembly that can rotate the nozzle of the feed system between different positions. For example, the nozzle can be in a first position in which the nozzle directs the flow of masa into the sheeter and a second position angularly offset from the first position in which the nozzle directs the flow of masa into a waste facility. By pivoting the feed system instead of moving the sheeter, evacuation procedures may be more time efficient and safer.

Thus, in accordance with some embodiments, a masa processing system can include one or more of: a sheeter and/or a support assembly. The support assembly can have a first configuration where a feed system is supported by the support assembly and a second configuration where the support assembly is configured to lift sheeter rollers from within the sheeter. In the first configuration, the feed system can be used to convey a feed of masa to the sheeter. In the second configuration, the masa processing system can include a crane. The sheeter can be configured to receive a feed of masa from the feed system and to form the feed of masa into a sheet for generating pre-cooked masa units. For example, the sheeter can include one or more sheeter rollers that can be used to form the pre-cooked masa units. The feed system can include a piping system that can include one or more spans of conduit that can be coupled to a source of the feed of masa and can convey the feed of masa to a nozzle. The nozzle can output the feed of masa into the sheeter. The support assembly can support the feed system and can allow the feed system to move between different positions/configurations. For example, the support assembly can be a pivotable support assembly. In a first position, the nozzle can be positioned over the sheeter for normal tortilla production. In a second position, the feed system can be rotated about a vertical axis such that the nozzle is disposed away from the sheeter. In the second position, the feed system can evacuate the masa into a container for disposal, for example. The pivotable support system can be disposed on one side of the sheeter. In some cases, the pivotable support system can be coupled to the side of the sheeter. The pivotable support assembly can include a post having a lower fixed end and an upper end, and a pivotable assembly coupled with the upper end of the post. The lower fixed end can be coupled to sheeter or with a ground surface. The pivotable assembly can include a transverse support and a pivot member rotatably coupled with the post and being pivotable about the vertical axis. In some cases, the pivotable support assembly can include one or more rollers configured to roll over a surface of the post to guide movement between the first position and the second position. The transverse support can be used to support the feed system when in the first configuration. The transverse support can have a first end coupled with the pivot member and a second end opposite the first end. The second end can be configured to be disposed over the sheeter in the first position.

The nozzle can be disposed away from the sheeter in the second position by being disposed away from a vertical axis extending up from a hopper of the sheeter. In some instances, the pivotable support assembly is configured to allow a user to maintain the nozzle at the same elevation in the first and second positions but to rotate the nozzle about an arc centered on the vertical axis (which can also be the axis of rotation of the pivotable assembly) by a distance sufficient to move the nozzle away from the space above the hopper.

The piping system can include a first span of conduit, a second span of conduit, and/or a third span of conduit. The first span of conduit can have an opening centered on the vertical axis. In this arrangement, as the pivotable support assembly moves from the first position to the second position, the first span of conduit rotates about the center of the opening. The second span of conduit can extend horizontally from the first span of conduit to a position over a central portion of the nozzle. The third span of conduit can be coupled to the nozzle. The third span of conduit can be branched to provide a plurality of parallel volumes of the feed of masa to the nozzle. A rotation interface can be provided at the opening of the first span of conduit between the piping system and a fixed conduit of a source of masa providing the feed of masa. The rotation interface can include one or more bearings and/or one or more bushings that can be configured to oppose side loading. In some cases, the rotation interface can include a food grade seal that can be configured to prevent leakage between the first span of conduit and the fixed conduit.

The transverse support can include a first arm and a second arm. Both the first arm and the second arm can be coupled with the pivot member at one end and with each other at one or more positions away from the ends coupled to the pivot member. The transverse support can be configured to support at least a portion of the feed system, such as the piping system. In one example, the transverse support can include a seat coupled with a bottom section of the second span of conduit to support the second span of conduit from below and above the nozzle. The seat can be supported by a brace that is coupled to the first arm and the second arm. The transverse support can include one or more tool engagement features that can be used for connecting a tool for applying a torque to the pivotable support assembly to move the pivotable support assembly between the first position and the second position. As such, in some cases the pivotable support assembly can be moved between the first position and the second position manually (e.g., using the tool). In other cases, a motorized system could be used to move between the first position and the second position.

When the support assembly is in the second configuration, the support assembly can be used to remove and replace rollers within the sheeter. In the second configuration, the crane can include a motor, a cable, and a pulley. The motor can include a drum and can rotate the drum to spool and unspool a cable routed over the pulley. In this arrangement, the cable can be configured to support the weight of at least one sheeter roller that can be lifted from within the sheeter. The pulley can be disposed at the second end of the transverse support. For example, the pulley can be supported by an axel that is supported by the first and second arms. In some cases, a first bracket and a second bracket can be coupled with the first arm and second arm respectively. The brackets can include one or more positions for mounting the pulley. When moving from the first configuration to the second configuration, the feed system can be removed, and the motor can be removably coupled to the transverse support. In the second configuration, the support assembly can move from the first position to the second position such that a roller connected to the cable would be disposed away from the sheeter. In some embodiments, the crane and the support assembly can form a crane assembly.

In another embodiment, a masa processing system can comprise a sheeter, a feed system, and a support assembly. The sheeter can be configured to receive a feed of masa and comprising one or more sheeter rollers to form the feed of masa into a sheet for generating pre-cooked masa units. The feed system can comprise a nozzle configured to output the feed of masa into the sheeter and a piping system. The piping system can comprise a conduit configured to be coupled to a source of the feed of masa and to convey the feed of masa to the nozzle. The support assembly can be disposed on one side of the sheeter. The support assembly can comprise a post having a lower fixed end and an upper end. A transverse support of the support assembly can have a first end supported by the post and a second end opposite the first end. The second end of the transverse support can be configured to be disposed over the sheeter. The support assembly can have a first configuration in which the transverse support is coupled with the conduit of the piping system over the nozzle and second configuration in which the transverse support is configured to lift the one or more sheeter rollers from within the sheeter.

In another embodiment, a masa processing system can comprise a sheeter, a feed system, and a crane assembly. The sheeter can be configured to receive a feed of masa and can comprise one or more sheeter rollers to form the feed of masa into a sheet for generating pre-cooked masa units. The feed system can comprise a nozzle configured to output the feed of masa into the sheeter. The crane assembly can comprise a post having a lower fixed end and an upper end. The lower fixed end can be coupled with the sheeter. The lower fixed end can be coupled with a ground surface adjacent to the sheeter. A pivot member of the crane assembly can be rotatably coupled with the post and can be pivotable about a vertical axis. The crane assembly can include a transverse support that has a first end coupled with the pivot member and a second opposite the first end. The transverse support can be configured to couple with the feed system over the nozzle. A crane supported by the transverse support and configured to lift the one or more sheeter rollers from within the sheeter. The transverse support can be rotated with the pivot member such that the one or more sheeter rollers can be disposed away from sheeter.

In another embodiment, a masa processing system can comprise a nozzle, a piping system, and a support assembly. The nozzle can be configured to output a feed of masa into a sheeter. The piping system can comprise a conduit configured to be coupled to a source of the feed of masa and to convey the feed of masa to the nozzle. The support assembly can comprise a post having a lower fixed end and an upper end and a transverse support. The transverse support can have a first end pivotably coupled with the post and a second end opposite the first end. The second end of the transverse support can be configured to be disposed above and transversely offset from the first end. The transverse support can be coupled with the conduit of the piping system over the nozzle. The support assembly can have a first configuration in which the nozzle is disposed at a first angular position relative to a vertical axis and positioned over the sheeter and a second configuration in which the transverse support is rotated about the vertical axis relative to the first angular position to position the nozzle in a second angular position offset from the first angular position and disposed away from the sheeter.

In another embodiment, a masa processing system can comprise a pivotable support assembly. The pivotable support assembly can be configured to be disposed on one side of a sheeter, the pivotable support assembly can comprise a post and a pivotable assembly. The post can have a lower fixed end and an upper end. The pivotable assembly can be coupled with the upper end of the post. The pivotable assembly can include a pivot member rotatably coupled with the post and being pivotable about a vertical axis and a transverse support having a first end coupled with the pivot member and a second end opposite the first end. The pivotable support assembly is configured to rotate about the vertical axis between a first position and a second position, wherein in the first position the second end of the transverse support is disposed over the sheeter, wherein in the second position, the second end of the transverse support is disposed away from the sheeter. The pivotable support assembly has a first configuration in which the transverse support is coupled with a piping system configured to convey a feed of masa to the sheeter, and a second configuration in which transverse support is configured to lift sheeter rollers from within the sheeter.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

Figure 1:
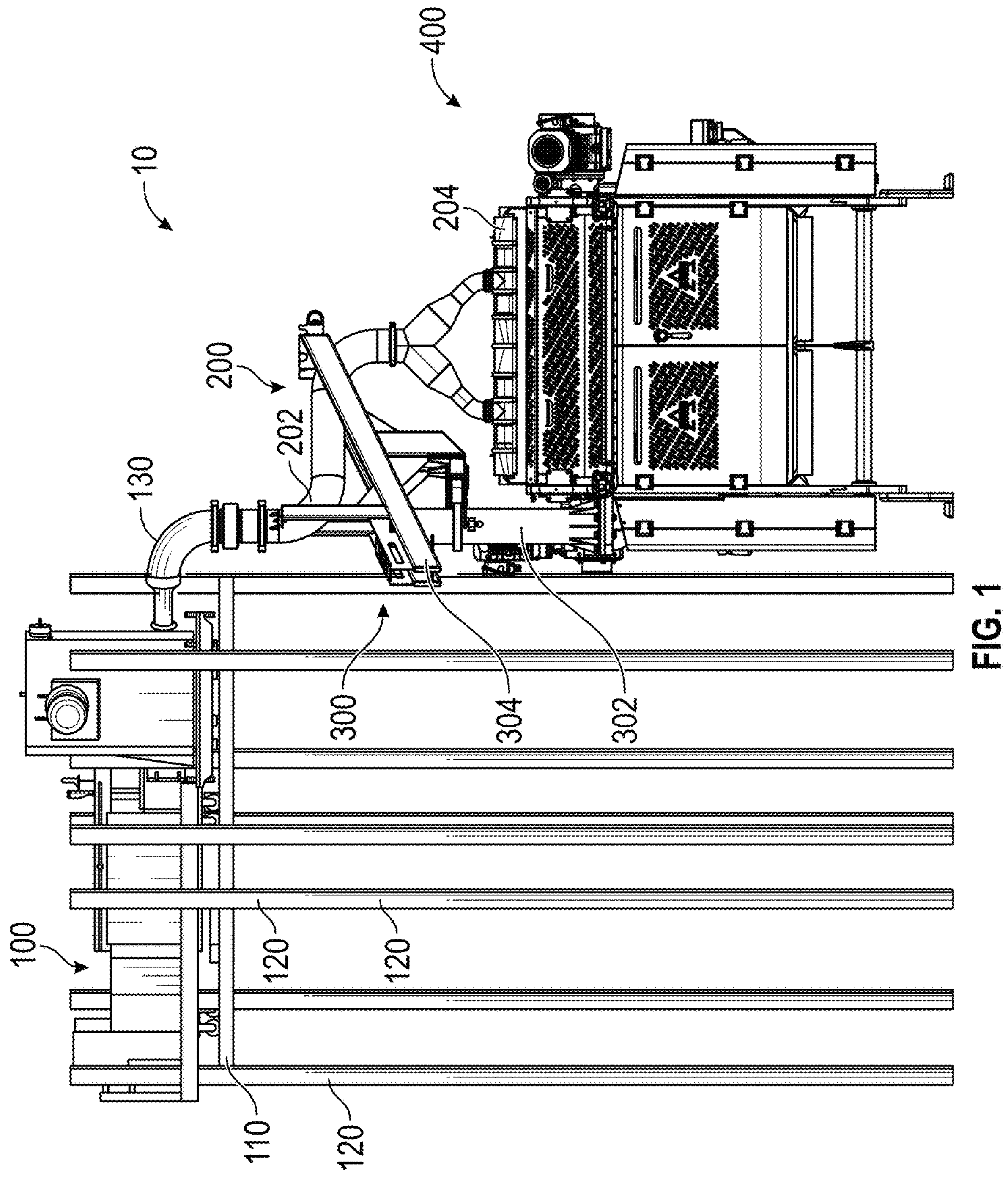
FIG. 1 illustrates a masa production environment including a sheeter with a support assembly.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Although the various embodiments disclosed herein may have specific relevance to food product production, the features, advantages, and other characteristics disclosed herein may have direct or indirect applicability to other applications, such as, for example, in other manufacturing applications that require evacuating a feed system, other mechanical devices, and/or the like.

During the production of corn tortillas and tortilla chips, pre-cooked units are cut from a sheet of corn dough, called "masa," and then baked and/or fried. In masa production, the sheeting and cutting stages are accomplished by a tortilla sheeter. Sheeters can be configured as large units that can weigh approximately 15,000 pounds or heavier and can be 10-15 feet tall or taller. Generally, the sheeter receives a flow of masa from an elevated feed system that delivers a flow of masa from a masa source system. The feed system and sheeter may operate for long periods of time (e.g., multiple days) without stops in production. The sheeter may receive approximately 3000 to 6000 pounds of masa per hour from the feed system. As part of a quality control procedure associated with food production, the feed system may be evacuated one or more times per week. Evacuation of the feed system involves pumping the flow of masa into a waste facility for a period of time (e.g., for 20 minutes or more). Traditional feed systems are in a fixed position in the food production facility. As a result, to facilitate an evacuation of the feed system, the sheeter must be moved away from the feed system and container may be brought in to receive the waste masa. Traditionally, sheeters may be moved using conventional means such as wheels or tracks. Because of the large size of the sheeters, moving a sheeter for an evacuation involves considerable effort and time. Any additional time spent moving the sheeter for an evacuation is time where the sheeters are not in production. Additionally, moving sheeters can require additional safety precautions to protect operators.

In order to improve the evacuation procedure of the feed system without requiring movement of the sheeter, a rotatable feed system (sometimes referred to as a pivotable feed system) can be utilized. The rotatable feed system can be supported by a pivotable support assembly that can rotate (or pivot) the nozzle of the feed system between different configurations. For example, the nozzle can be in a first configuration or first position in which the nozzle directs the flow of masa into the sheeter and a second configuration or section position angularly offset from the first configuration in which the nozzle directs the flow of masa into a waste facility. These configurations are discussed below in connection with FIG. 10 after a description of the sheeter and pivotable feed system is provided. The pivotable support assembly can be fixed to the sheeter itself or fixed to a ground surface adjacent to the sheeter. By pivoting the feed system instead of moving the sheeter, evacuation procedures may be more time efficient and safer.

FIG. 1 illustrates an example masa production environment 10. The masa production environment 10 can include a masa source system 100, a feed system 200, a support assembly 300, and/or a sheeter 400. The masa source system 100 is configured to direct a source or flow of masa through a pipe or conduit system to the feed system 200. The masa source system 100 may include various pumps and other components for directing the flow of masa. The masa source system 100 may be elevated above the feed system 200, support assembly 300, and sheeter 400. For example, as shown in FIG. 1, the masa source system 100 is supported on an elevated platform 110. The elevated platform 110 may include any sort of supporting structure, such as a series of supports/legs 120. The masa source system 100 may direct the source of masa to the feed system 200 via a fixed conduit 130. The fixed conduit 130 can interface with and deliver a feed of masa to the feed system 200 via a piping system 202 of the feed system 200.

Figure 10:
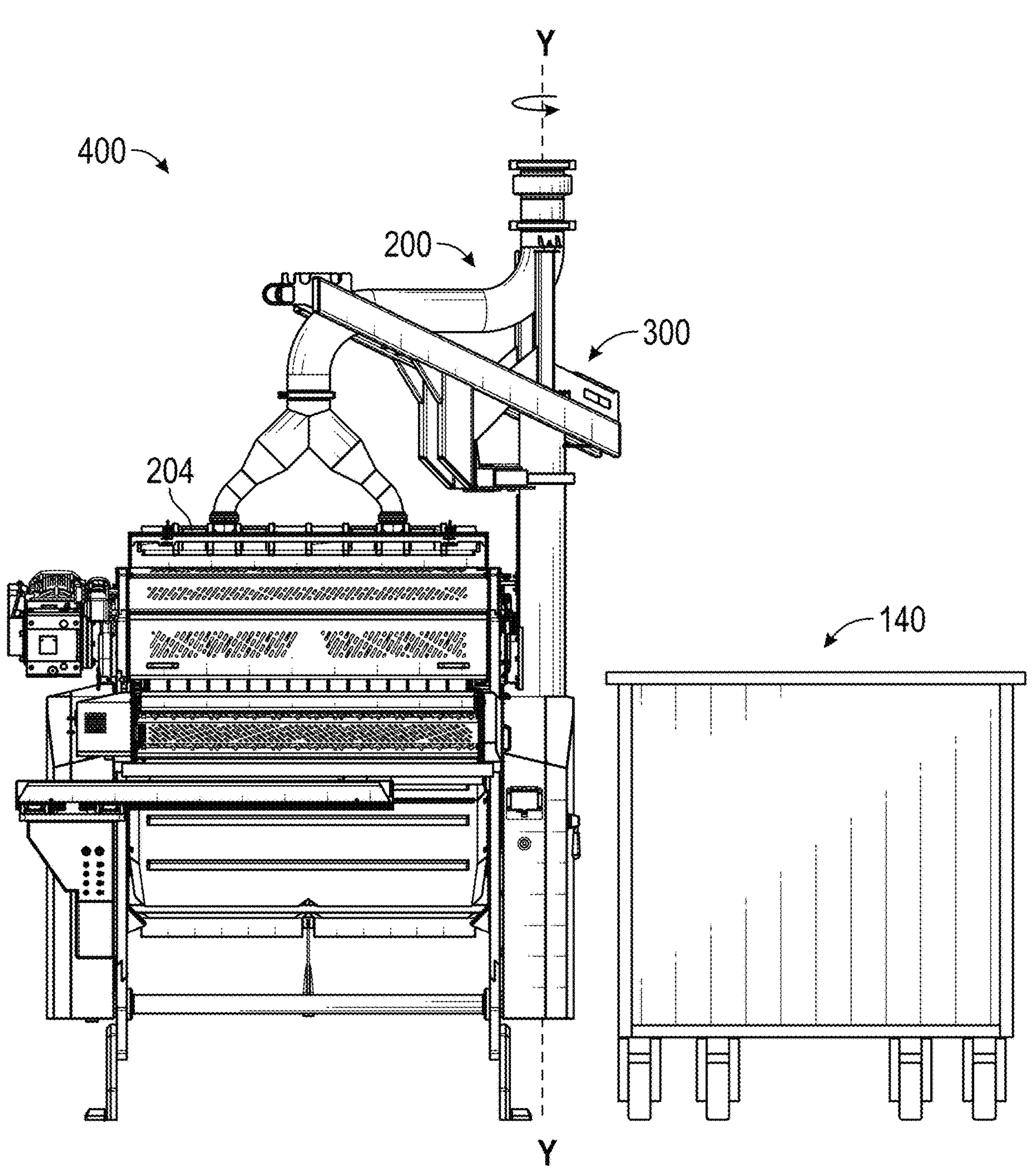
FIG. 10 illustrates two configuration of the pivotable feed system of FIG. 7A.

The feed system 200 can include a piping system 202 and a nozzle 204. The piping system 202 can receive the feed of masa from the masa source system 100 and direct the feed of masa to the nozzle 204. The nozzle 204 outputs and directs the flow or feed of masa to a target location. For example, the nozzle 204 is generally used to direct the feed of masa towards the sheeter 400 for further processing. Generally, the nozzle 204 is suspended above the ground surface. For example, the nozzle 204 may be 6, 8, 10, 12, 14, or more feet above the ground surface. Periodically, the nozzle 204 may be used to direct the feed of masa to one or more containers 140, as illustrated in FIG. 10. The feed of masa may be directed to the containers 140 when the feed system 200 and/or masa source system 100 are being evacuated, as described above. In some embodiments, the support assembly 300 can be used to pivot or change the location of the feed system 200 and the nozzle 204. For example, the feed system 200 may be positioned in a first position where the nozzle 204 directs the feed of masa into the sheeter 400 (e.g., as shown in FIG. 10). The feed system 200 may be rotated via the support assembly 300 to a second position (e.g., as illustrated by the arrow disposed above the axis Y-Y in FIG. 10) where the nozzle 204 directs the feed of masa into the containers 140. In some examples, the containers 140 may be rotationally offset from the sheeter 400 (e.g., by 180 degrees), such that the feed system 200 can be rotated between the first position and the second position without moving the sheeter 400.

With continued reference to FIG. 1, the masa production environment 10 can include the support assembly 300. The support assembly 300 can be in a first configuration, shown in FIG. 2A, and in a second configuration, shown in FIG. 2B. In the first configuration, the support assembly 300 can be used to support the feed system 200. For example, the support assembly 300 can support the feed system 200 in the first position for directing the feed of masa to the sheeter 400 and the second position for directing the feed of masa to the one or more containers 140. In the second configuration, the support assembly 300 can be used to support a crane system 350. As described herein, the crane system 350 can be used to remove rollers from the sheeter 400.

The support assembly 300 can include a vertical support or post 302 and a transverse support 304. The transverse support 304 may be coupled to the post 302. The transverse support may be configured to support the feed system 200 and/or the crane system 350, depending on the configuration. The transverse support 304 can be configured to rotate about a vertical axis Y (see e.g., FIGS. 2A, 2B, and 10) of the post 302. The vertical axis Y may define the rotational center of the support assembly 300. The support assembly 300 may be coupled to the sheeter 400. In some embodiments, the support assembly 300 may be positioned adjacent to the sheeter 400. For example, the support assembly 300 can be fixed to a ground surface near the sheeter 400. The feed system 200 and the support assembly 300 are described in further detail with respect to at least FIGS. 7A and 7B.

Figure 2A:
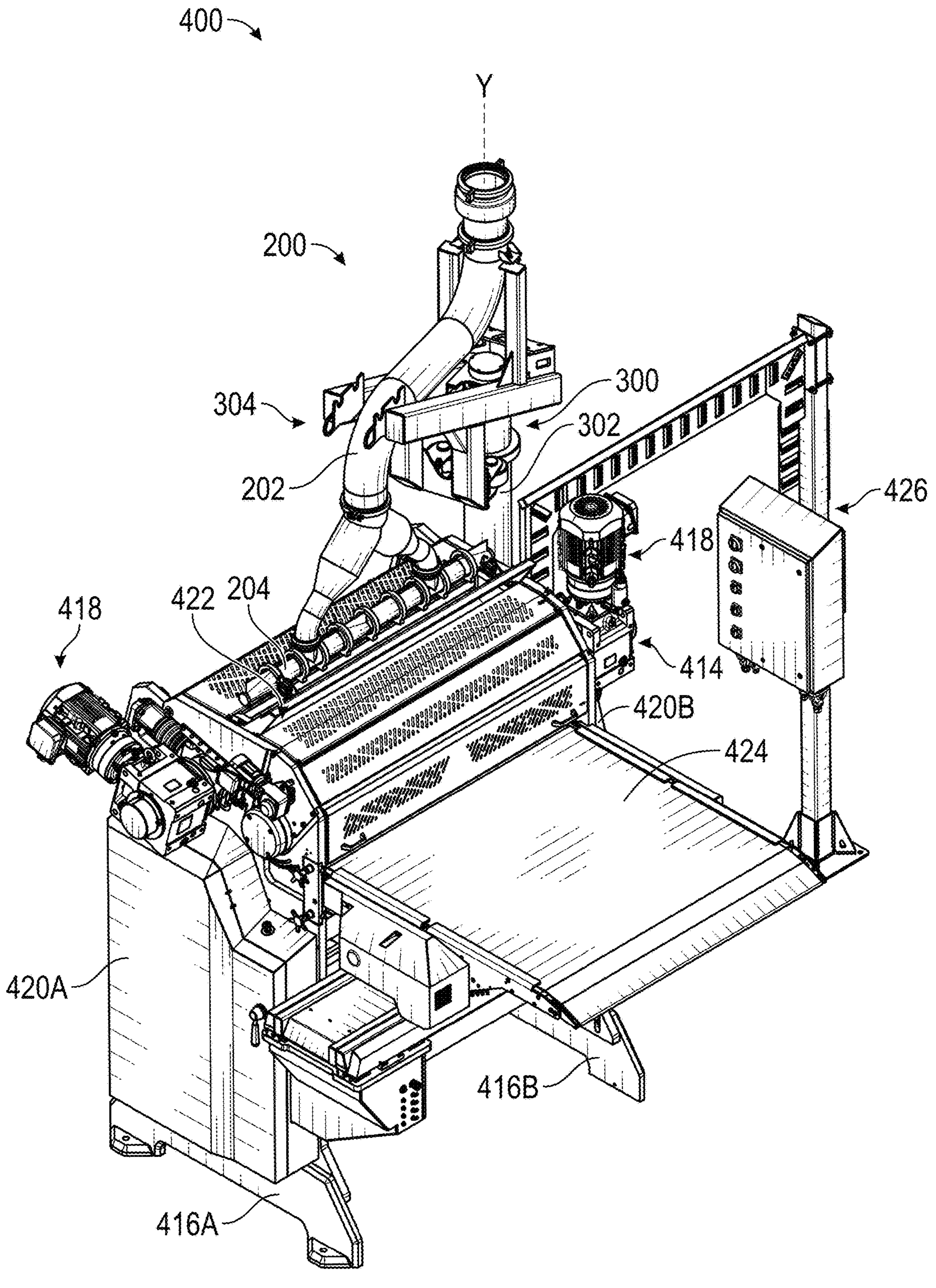
FIG. 2A illustrates a perspective view of the sheeter of FIG. 1 with the support assembly in a first configuration for supporting a feed system.
Figure 2B:
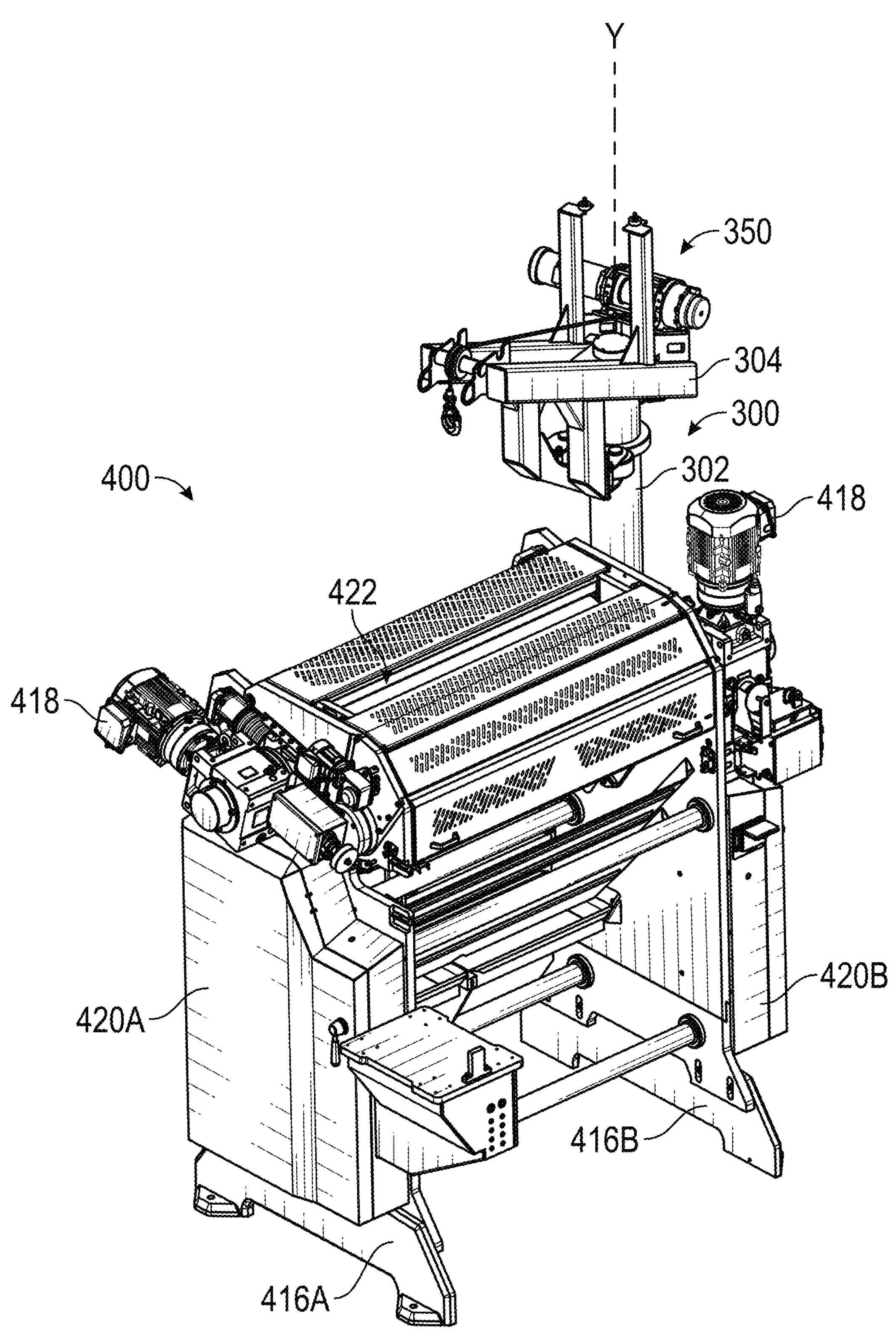
FIG. 2B illustrates a perspective view of the sheeter of FIG. 1 with the support assembly in a second configuration for supporting a crane system.

FIGS. 2A and 2B illustrate perspective views of an embodiment of a sheeter 400. In FIG. 2A, the support assembly 300 is in a first configuration in which the support assembly 300 is supporting the feed system 200. In FIG. 2B, the support assembly 300 is in a second configuration in which the support assembly 300 is supporting the crane system 350. The support assembly 300 can move from the first configuration to the second configuration by removing the feed system 200 and adding the crane system 350 and associated components to the support assembly 300.

The sheeter 400 is in the configuration for tortilla production, and can include various types of electronic thickness control, pinch point gap control, and other related systems and functionality. As shown in FIG. 2A, when the support assembly 300 is in the first configuration and in a first position with the nozzle 204 disposed over the sheeter 400, the sheeter 400 can receive a feed of masa from the feed system 200. The sheeter 400 can be configured to form the feed of masa into a sheet for generating pre-cooked masa units. FIGS. 2A and 2B illustrate the sheeter 400 with some of the components and coverings removed to illustrate some of the internal components of the sheeter 400. The coverings may provide some protection to the internal components to, for example, prevent any food production material from compromising any mechanical components and to prevent mold from growing inside the sheeter 400.

With continued reference to FIGS. 2A and 2B, the sheeter 400 can include a control system 426, a roller drive assembly 414, and a support frame assembly 416. The control system 426 can control the operations of the sheeter 400. For illustrative purposes, the control system 426 is not included in every Figure. The support frame assembly 416 is in the form of a housing which can include and support various types of devices for operations of the sheeter 400. In the present embodiment, the support frame assembly 416 includes a right-side plate member 416A and a left-side plate member 416B. Both the right-side plate member 416A and the left-side plate member 416B are partially covered with external coverings 420A and 420B respectively. The roller drive assembly 414 can include one or more electric motors 418 and an appropriate gear reduction mechanism for driving a shaft of one or more of the rollers (not shown). The roller drive assembly 414 is attached to the support frame assembly 416. Additionally, a hopper assembly 422 is supported above the sheeter rollers of the roller drive assembly 414. The hopper assembly 422 is configured to receive a feed of masa from the feed system 200.

The roller drive assembly 414 includes a front sheeter roller (not shown) and a rear sheeter roller (not shown). Both the front roller and the rear roller may be generally cylindrical. The sheeter rollers may have a slightly roughened surface (obtained, for example, with sandblasting), which may provide benefits to the production of various food products, such as, for example, tortillas. The sheeter rollers are rotated in opposite directions and can be driven at the same speed or slightly different speeds, depending on desired performance characteristics. The sheeter rollers may be positioned generally parallel to each other. For example, the central axis of the front roller may be vertically aligned with the central axis of the rear roller. Generally, both the front roller and the back roller may have approximately the same diameter. However, in some embodiments, the diameters of the front and rear rollers may differ, and the central axes of the sheeter rollers may be offset as a result. The roller drive assembly 414 can also include a cutting roller (not shown). The cutting roller may include a plurality of raised edges and recesses (also referred to as "cutting guides") for cutting pieces of dough (e.g., into pre-cooked masa units). The shape of the dough depends on the shape of the raised edges (e.g., circles, triangles, etc.) The pre-cooked masa units can be deposited on a discharge conveyer 424 from the cutting roller for further processing (e.g., baking).

Figure 3:
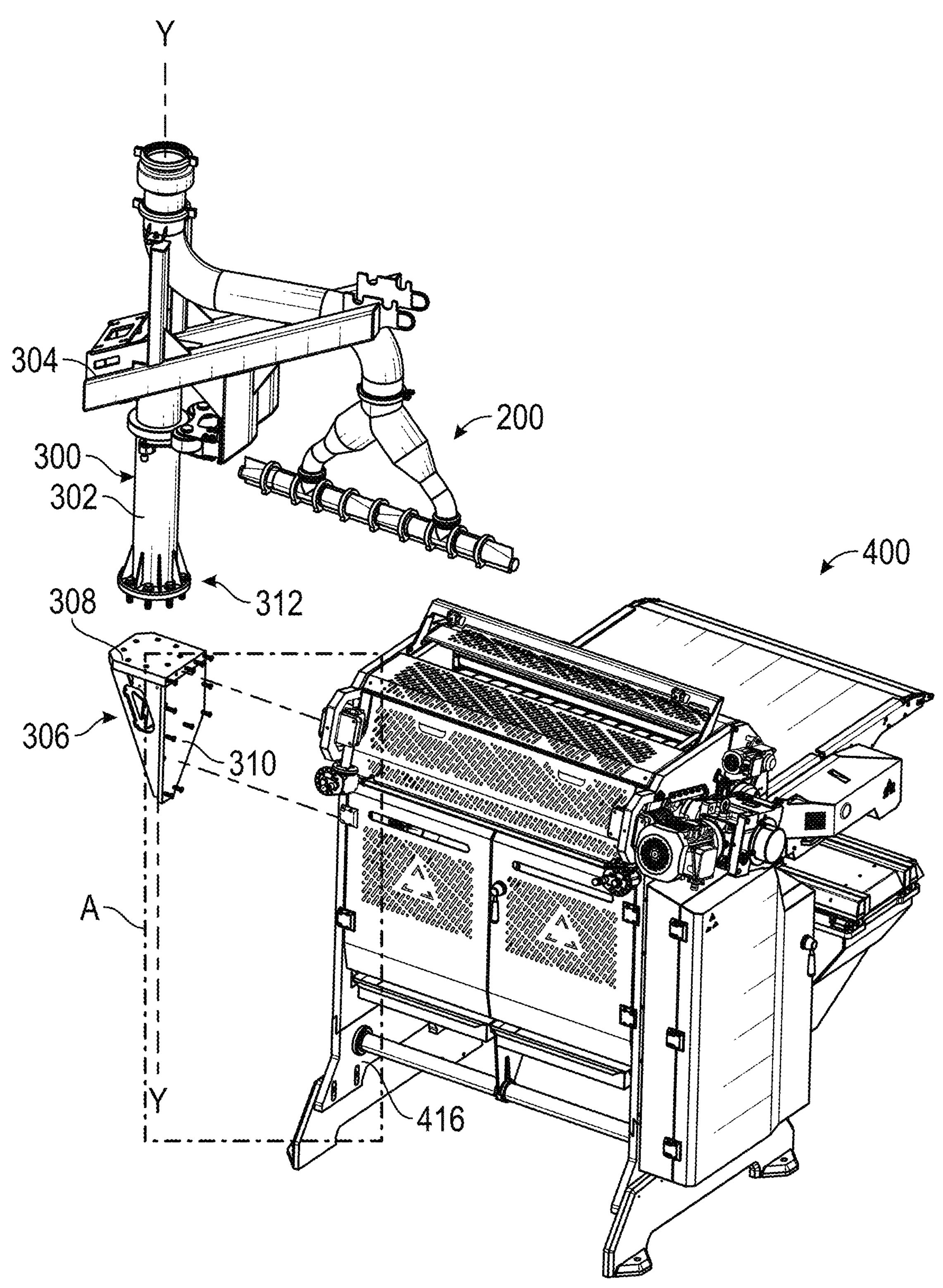
FIG. 3 illustrates a partially exploded view of the sheeter, support assembly, and feed system of FIG. 2A.
Figure 4:
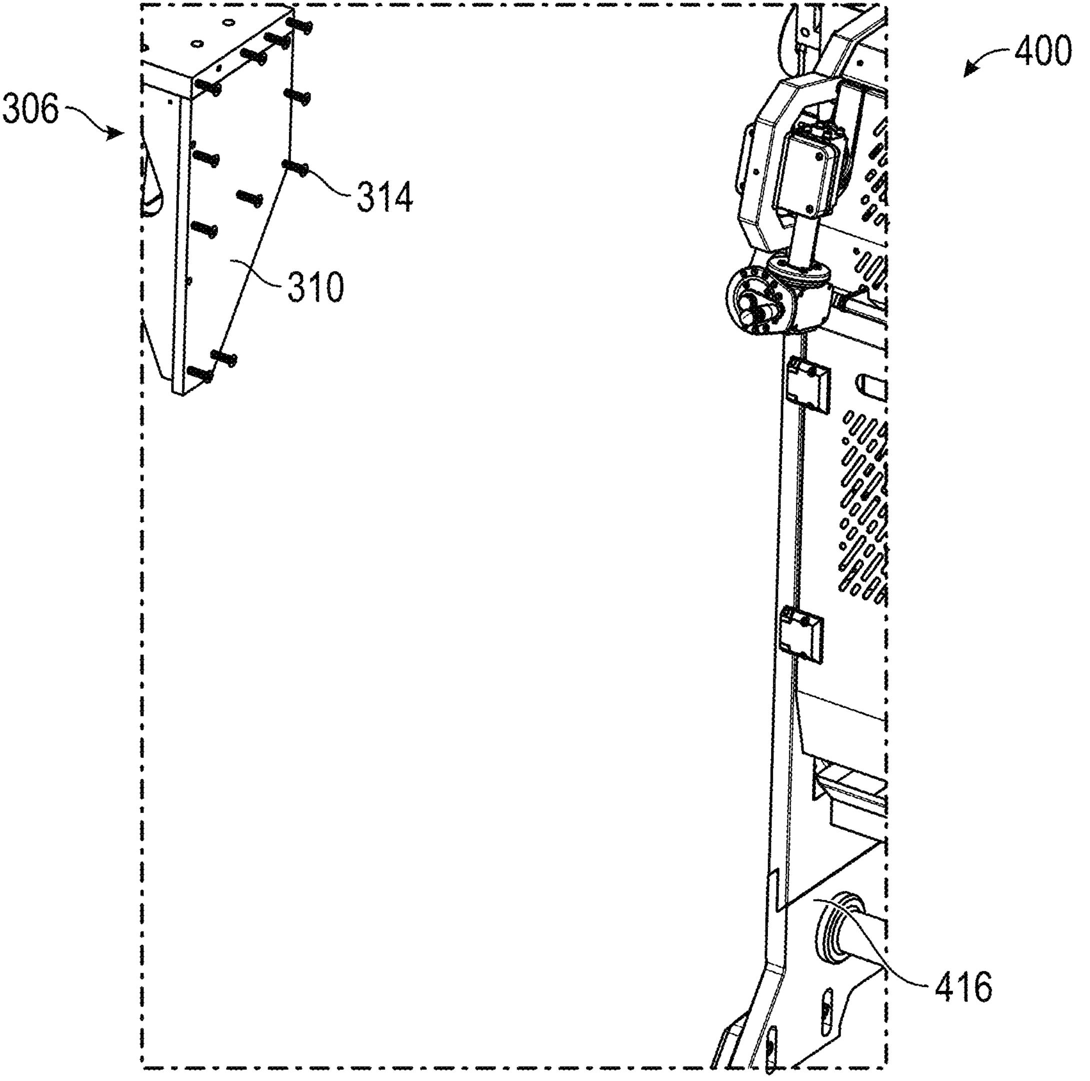
FIG. 4 illustrates the detail view B of FIG. 3.

FIG. 3 illustrates a partially exploded view of the support assembly 300 coupled to the sheeter 400. In some embodiments, the support assembly 300 can be separate from the sheeter 400 and may be supported by the ground or another system. As shown in FIG. 3, the support assembly 300 may include a post 302, a transverse support 304, and a boom base 306. The transverse support 304 can be configured to support the feed system 200 and/or the crane system 350, depending on the configuration. The post 302 can support the transverse support 304. The boom base 306 can be configured to couple the support assembly 300 to the sheeter 400. The boom base 306 can include a top surface 308 and a side mounting surface 310. The top surface 308 can be configured to couple to a lower end 312 of the post 302. The lower end 312 can be fixed to the boom base 306 as discussed below. The side mounting surface 310 can be configured to couple to the sheeter 400. For example, the side mounting surface 310 may couple to the support frame assembly 416 of the sheeter 400. As shown in FIG. 4, which illustrates the detail view B of FIG. 3, the boom base 306 may be coupled to the sheeter 400 via a plurality of fasteners 314. In some embodiments, the boom base 306 may be fixed to the sheeter 400 via any conventional means, such as, for example, welding.

Figure 5:
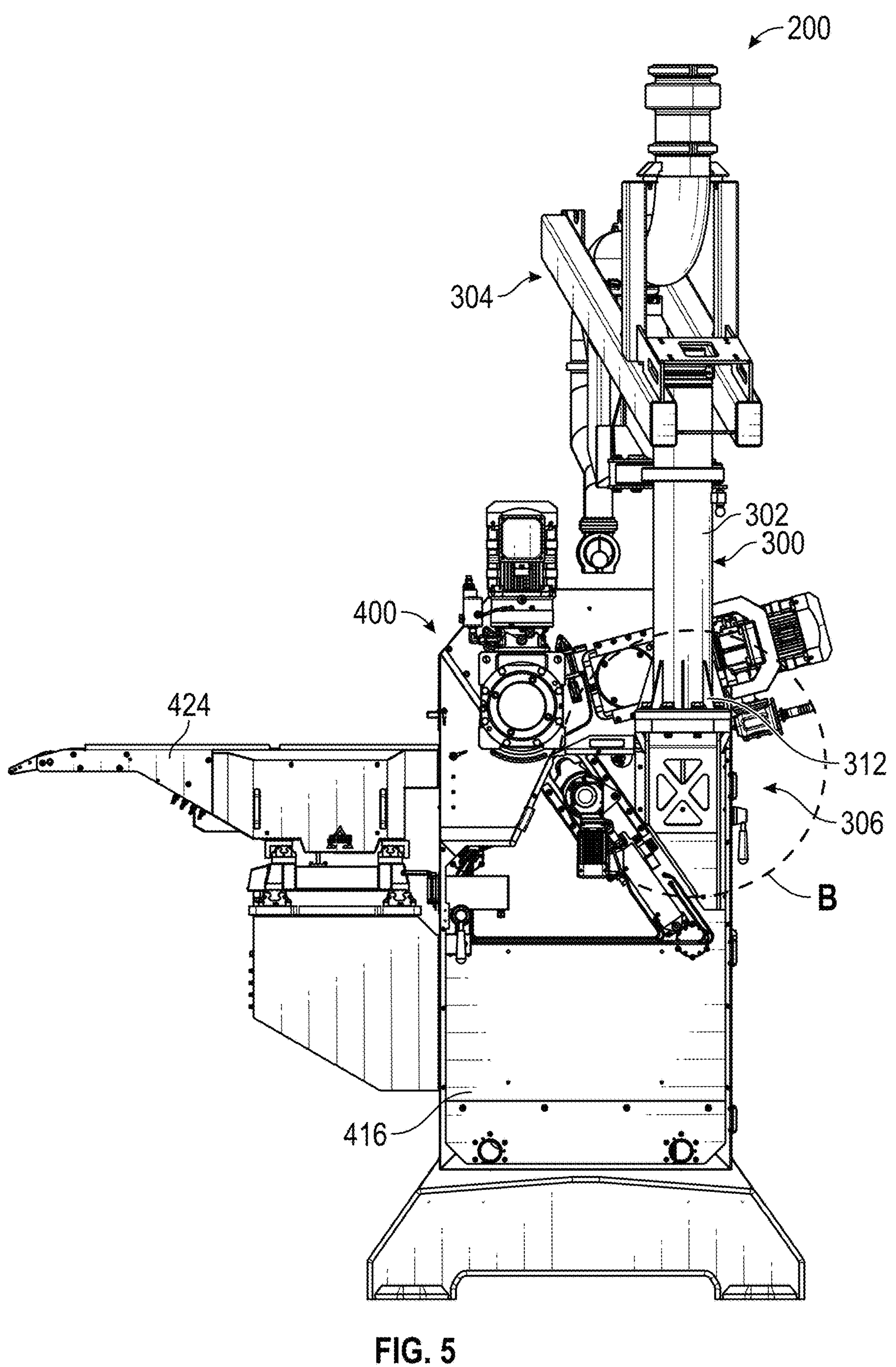
FIG. 5 illustrates a left side view of the sheeter and support assembly of FIG. 2A.
Figure 6:
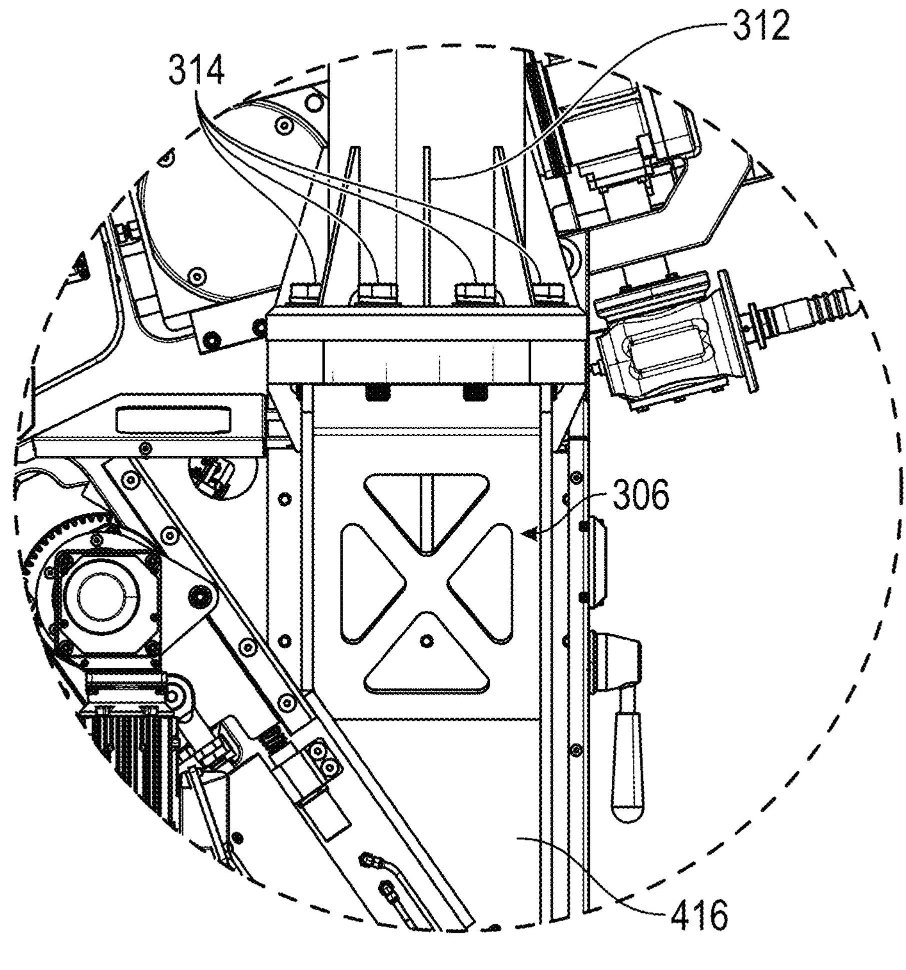
FIG. 6 illustrates the detail view A of FIG. 5.

FIG. 5 illustrates a left side view of the sheeter 400 with the support assembly 300 coupled to the support frame assembly 416. As shown in FIG. 6, which illustrates the detail view A of FIG. 5, the lower end 312 of the post 302 may be fixed to the boom base 306 by the plurality of fasteners 314. When the support assembly 300 is coupled to the sheeter 400, the lower end 312 of the post 302 is fixed relative to the sheeter 400. As noted above, in some embodiments, the support assembly 300 may be directly fixed to a ground surface, such as the floor with a floor boom base (similar to the boom base 306). In this embodiment, the sheeter 400 would be positioned adjacent to the ground fixed support assembly 300.

Figure 7A:
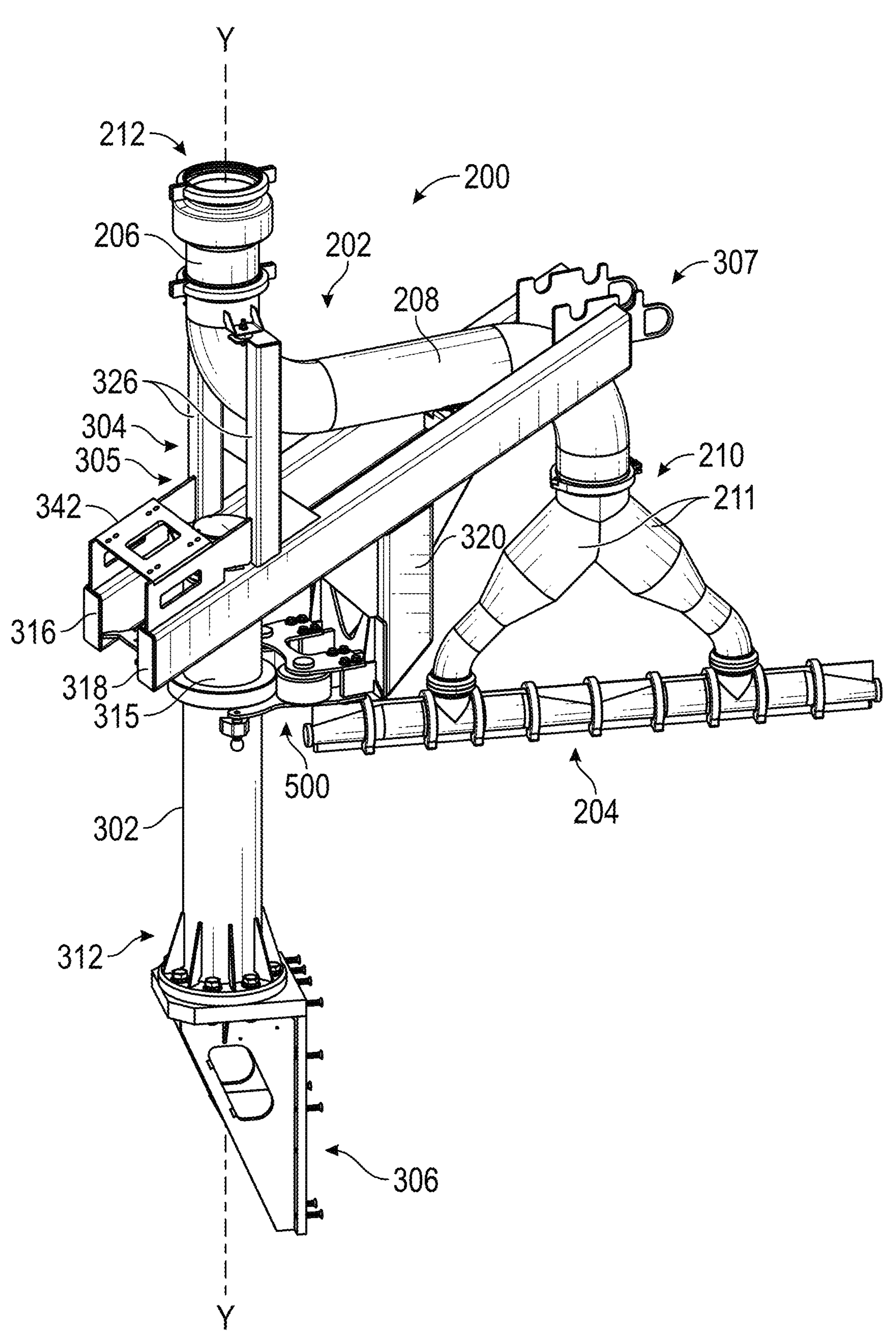
FIG. 7A illustrates an isolation perspective view of a pivotable feed system for a masa conveying system including a support assembly, a feed system, and a pivotable assembly.
Figure 7B:
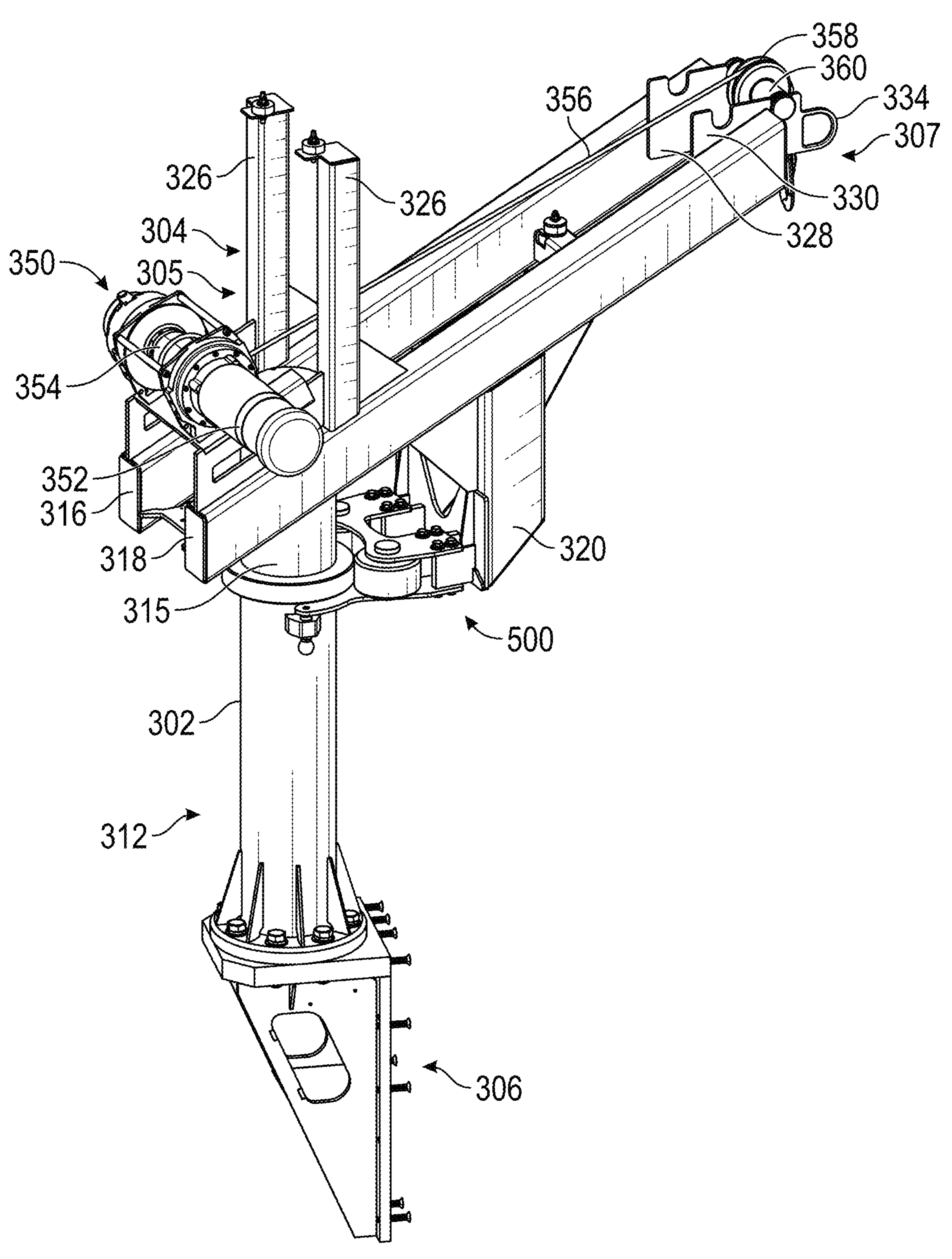
FIG. 7B illustrates an isolation perspective view of a pivotable feed system for a masa conveying system including a support assembly, a crane system, and a pivotable assembly.

FIG. 7A illustrates an isolation perspective view of the feed system 200, the support assembly 300, and a pivotable assembly 500. FIG. 7B illustrates an isolation perspective view of the support assembly 300, the crane system 350, and the pivotable assembly 500. In FIG. 7A, the support assembly 300 is in the first configuration and supporting the feed system 200. In FIG. 7B, the support assembly 300 is in the second configuration and supporting the crane system 350.

Referring first to FIG. 7A, the feed system 200 is configured to deliver a flow of masa from the masa source system 100. When the support assembly 300 is in the first position (see e.g., FIG. 2A), the feed system 200 delivers the flow of masa to the sheeter 400 for processing. When the support assembly 300 is in the second position, the feed system 200 can deliver the flow of masa to the containers 140 for disposal. The feed system 200 can include a piping system 202. The piping system 202 may include a first span of conduit 206, a second span of conduit 208, and a third span of conduit 210. The first span of conduit 206 includes an opening 212. The opening 212 may be centered on the vertical axis Y. The opening 212 can be configured to connect to the fixed conduit 130 of the masa source system 100. The opening 212 may connect with the fixed conduit 130 via a rotation interface such that the first span of conduit 206 can rotate about the vertical axis Y relative to the fixed conduit 130. The rotation interface may include one or more bearings and/or one or more bushings (not shown) that can be configured to oppose side loading. The rotation interface may include a food grade seal (not shown) to prevent leakage (e.g., of the feed of masa) between the rotatable first span of conduit 206 and the fixed conduit 130. The bearings/bushings and the food grade seal can allow low force rotation of the nozzle 204 while containing the feed of masa during normal production operation or otherwise when the piping system 202 is pressurized.

The first span of conduit 206 may be connected to the second span of conduit 208. The second span of conduit 208 may extend transversely, for example, horizontally, from the first span of conduit 206 such that the second span of conduit 208 is positioned over a central portion of the nozzle 204. As described with reference to FIG. 9, the second span of conduit 208 may be supported directly by the support assembly 300. The third span of conduit 210 may be connected to the second span of conduit 208 and the nozzle 204. The third span of conduit 210 may include branches 211. Having a branched third span of conduit 210 may provide benefits of providing parallel feed volumes of the feed of masa to the nozzle 204. As the nozzle 204 produces a sheet of masa that extends out of the bottom side of the nozzle 204, distributing the feed of masa along the length of the nozzle 204 via the branched third span of conduit 210 may provide for a more even sheet of masa to be delivered to the sheeter 400 for further processing.

As illustrated in FIGS. 2A and 3, the feed system 200 extends away from both the masa source system 100 and the post 302 of the support assembly 300. The feed system 200 may provide a significant load on the support assembly 300 due to the weight of the piping system 202 and the nozzle 204. This weight is increased when the feed of masa is passing through the feed system 200.

The support assembly 300 is configured to support the feed system 200 and/or the crane system 350, depending on the configuration. The support assembly 300 also allows the feed system 200 and the crane system 350 to be rotated about the axis of rotation Y between the first position and the second position. The support assembly 300 can include the post 302 and the transverse support 304. The post 302 is configured to support the transverse support 304. The post 302 can include a lower end 312 and an upper end 315. As described above, the lower end 312 is generally fixed. For example, the lower end 312 may be fixed to the sheeter 400 (e.g., via the boom base 306) or to a ground surface. A portion of the post 302, such as the upper end 315, may be rotationally coupled with the pivotable assembly 500 via a pivot member 501 (see e.g., FIG. 8).

The transverse support 304 can be configured to support at least a portion of the feed system 200 in the first configuration and the crane system 350 in the second configuration. The transverse support 304 can include a first arm 316 and a second arm 318. A first end 305 of the transverse support 304 may be coupled with the pivot member 501. A second end 307 of the transverse support 304 may extend distally away from the post 302. The second end 307 is configured to be disposed over the sheeter 400 in the first configuration. The second end 307 is configured to be disposed away from the sheeter 400 (e.g., over the containers 140) in the second configuration. At least a portion of the feed system 200 extends through the gap between the first arm 316 and the second arm 318.

The first arm 316 and the second arm 318 may be coupled with the pivotable assembly 500 near the first end 305. For example, the arms 316, 318 may be coupled with each other and the pivotable assembly 500 near the first end 305 via an extension member 320. The extension member 320 may extend vertically from the arms 316, 318 towards the ground surface. The extension member 320 may be coupled to a roller assembly 502 of the pivotable assembly 500, as described with reference to FIG. 8.

Figure 9:
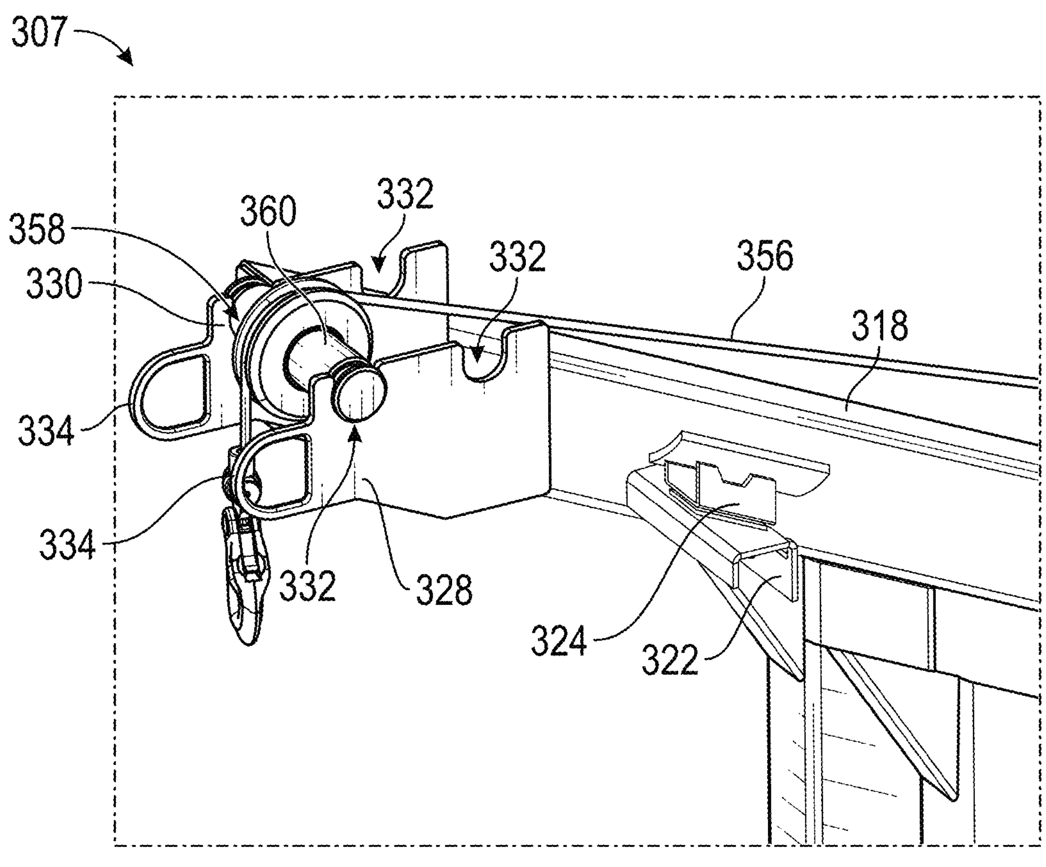
FIG. 9 illustrates a close up view of a second end of a transverse support of the support assembly of FIG. 7B.

The first arm 316 and the second arm 318 may be coupled with each other at one or more locations extending from the first end 305 to the second end 307. For example, with reference to FIG. 9, which illustrates a close up view of the second end 307 of the transverse support 304, the first arm 316 may be coupled with the second arm 318 via a brace 322. In FIG. 9, the first arm 316 is not shown for illustrative purposes only. A first end of the brace 322 can be coupled to the first arm 316 and a second end of the brace 322 can be coupled to the second arm 318. A top surface of the brace 322 can support a seat 324. The seat 324 can comprise a rounded support configured to receive and support a portion of the piping system 202. For example, the seat 324 may support a bottom surface of the second span of conduit 208. Other ways of distributing the load of the piping system 202 can be provided that do not require the seat 324 or the brace 322 as will be apparent. For example, the brace 322 could be rounded to allow the second span of conduit 208 to directly nest therein.

As noted above, the feed system 200 provides a significant load on the support assembly 300. The third span of conduit 210 and the nozzle 204 may be the heaviest components of the feed system 200. Because the third span of conduit 210 and the nozzle 204 extend past the point of support of the support assembly 300 (e.g., the brace 322 and seat 324), and are at a large distance from the vertical axis Y, a large moment is generated. The large moment provides an angular load on the pivotable assembly 500. Additionally, the large moment may allow the feed system 200 to be rotated about the vertical axis Y without the use of motors, as explained below.

With continued reference to FIG. 9, the transverse support 304 may further include a first bracket 328 and a second bracket 330. The first bracket 328 may be coupled to the first arm 316 near the second end 307 and the second bracket 330 may be coupled to the second arm 318 near the second end 307. The brackets 328, 330 include a plurality of axle retaining features 332 (e.g., semi-circular slots) configured to receive an axle 360 of the crane system 350. While the brackets 328, 330 illustrated in FIG. 9 include two axle retaining features 332 each, it is recognized that the brackets 328, 330 can include any number of axle retaining features 332 (e.g., one, three, or more than two such features). The axle retaining features 332 allow the axle 360 and associated pulley 358 to be positioned in multiple locations above the sheeter 400. As described further herein, the crane system 350 may be used to remove rollers from the sheeter 400. As such, it may be desirable to position the pulley 358 in different locations along the transverse support 304 to retrieve different rollers of the sheeter 400 or to allow the system to be adjusted for rollers of different format sheeters.

The brackets 328, 330 may also include tool engagement features 334. The tool engagement features 334 may be hooks, eyelets, and/or the like. The tool engagement features 334 may enable the support assembly 300 to be moved between the first position and the second position with manual operation. For example, an operator may use an engagement tool, such as a gaff (not shown) to engage the tool engagement features 334 and apply torque to manually rotate the support assembly 300 about the vertical axis Y. By enabling movement of the nozzle 204 using a gaff or similar tool without requiring a motor, the system can avoid additional safety and maintenance costs associated with such additional equipment. In some embodiments, the support assembly 300 may include a motor for rotating the support assembly 300 about the vertical axis Y.

Referring back to FIG. 7A, in some embodiments, the support assembly 300 may include additional support features. For example, the support assembly 300 may include vertical support members 326. The vertical support members 326 may be coupled at their first ends to the first arm 316 and the second arm 318 near the first end 305. The vertical support members 326 may extend away from the boom base 306. The vertical support members 326 may be coupled at their second ends to the feed system 200. For example, the vertical support members 326 may be coupled to the first span of conduit 206. The vertical support members 326 may provide additional support to support the weight of the support assembly 300 and any weight supported by the support assembly 300, such as, for example, the feed system 200 itself or a sheeter roller (e.g., the roller 406 of FIG. 11) when the support assembly 300 is in the second configuration and includes the crane system 350.

Figure 8:
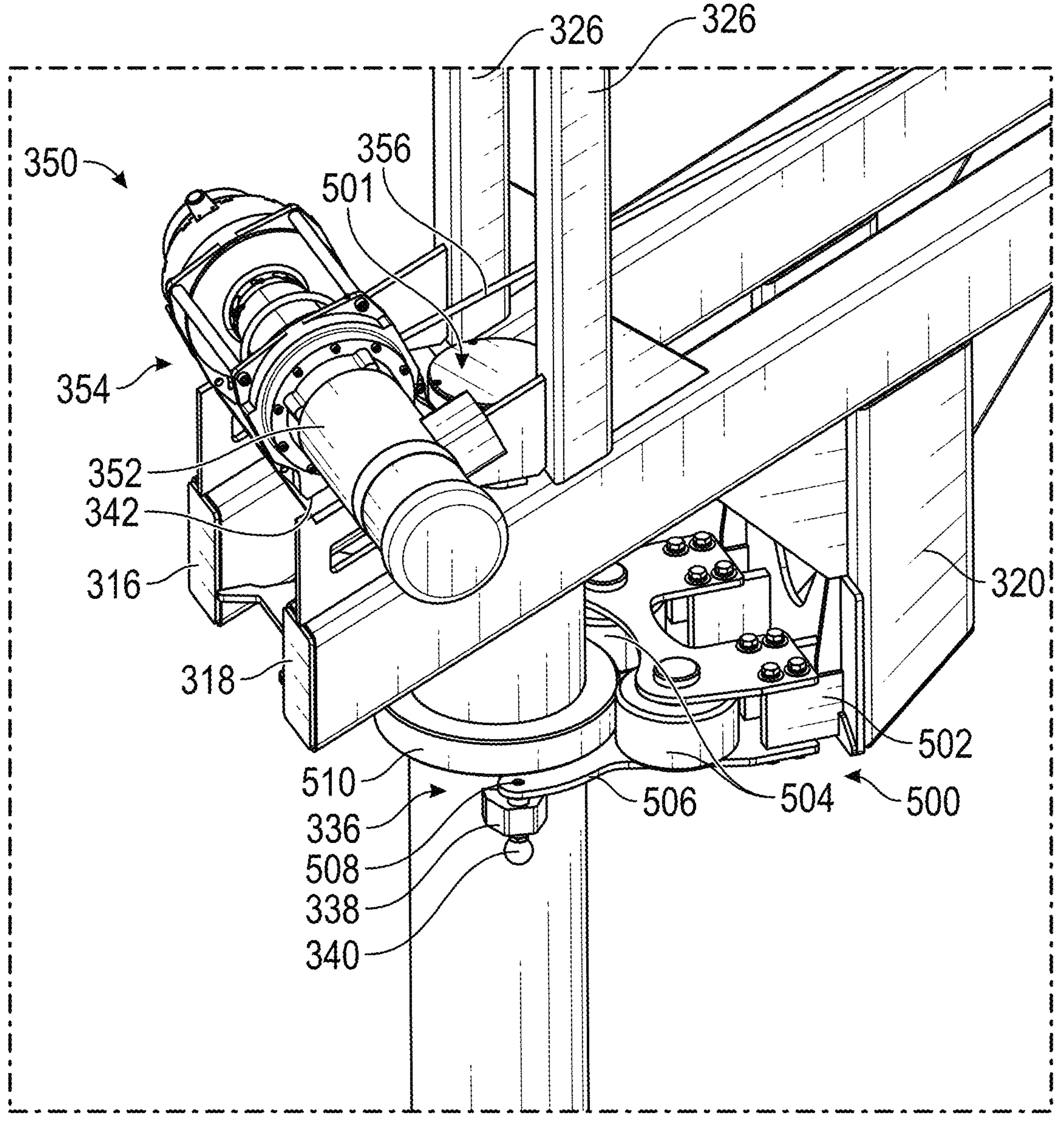
FIG. 8 illustrates a close up view of a first end of a transverse support of the support assembly of FIG. 7B.

Referring now to FIG. 7B and FIG. 8, which illustrates a close up view of the first end 305 of the transverse support 304, including the crane system 350 and the pivotable assembly 500, the support assembly 300 is shown in the second configuration. The pivotable assembly 500 is configured to allow the support assembly 300 to move between the first position, where the second end 307 of the transverse support 304 is disposed over the sheeter 400, and the second position, where the second end 307 of the transverse support 304 is disposed away from the sheeter 400. The pivotable assembly 500 can include the pivot member 501 and the roller assembly 502. The pivot member 501 may be rotationally coupled to the post 302. The pivotable assembly 500 is configured to allow the transverse support 304 and the feed system 200 to pivot/rotate relative to the post 302 in a low friction manner about the vertical axis Y between the first position and the second position. The roller assembly 502 can include a baseplate 506 and one or more rollers 504. The roller assembly 502 may be coupled to the support assembly 300 via the extension member 320 of the transverse support 304. The baseplate 506 may be disposed at least partially about the circumference of the post 302. The baseplate 506 may be configured to support the one or more rollers 504. The baseplate 506 may also include one or more lock holes 508. The one or more lock holes 508 may be located at spaced apart locations about the post 302 and may define different angular positions for the support assembly 300 about the vertical axis Y (e.g., 0 degrees, 90 degrees, 180 degrees, etc.). The one or more lock holes 508 may be configured to engage with a locking system 336 of the support assembly 300. The locking system 336 may include a lock mount 338 and a lock pin 340. The lock mount 338 may be fixed to the post 302 and the lock pin 340 may removably extend though a slot in the lock mount 338. The lock pin 340 may be configured to removably extend through the lock mount 338 and into one of the one or more lock holes 508. In some configurations, the lock pin 340 may be spring loaded, such that the lock pin 340 is disposed to extend through the lock mount 338 unless an opposing force is applied to the lock pin 340. The lock pin 340 can comprise a plunger. When the lock pin 340 engages one of the one or more lock holes 508, the support assembly 300 may have a fixed angular position relative to the vertical axis Y. When the lock pin 340 is disengaged from the one or more lock holes 508, the support assembly 300 may be free to rotate about the vertical axis Y as described herein. For example, when the lock pin 340 engages a first hole of the one or more lock holes 508, the support assembly 300 may be in a first angular configuration corresponding to the first position. To move to the second angular configuration, the lock pin 340 may be removed from the first hole and the support assembly 300 may be rotated about the vertical axis Y. The lock pin 340 may then engage a second hole of the one or more lock holes 508 that defines the second position and the support assembly 300 may then be fixed at that location. The one or more rollers 504 are configured to roll about a surface of the post 302 in a low friction manner. The one or more rollers 504 may be spaced apart about the circumference of the post 302. For example, when the pivotable assembly 500 includes two rollers 504, there may be a gap between the two rollers 504. The gap can correspond to about a 5, 10, 15, 20, 25, 30, 35, or 40 degree angle between a first radius extending from the vertical axis Y to the center of rotation of one of the one or more rollers 504 and a second radius extending from the vertical axis Y to the center of rotation of the other of the one or more rollers 504. In this example, the two rollers 504 apply two points or lines of contact to the post 302. The roller assembly 502 is configured to guide movement of the support assembly 300 between the first configuration and the second configuration. The rollers 504 also allow a transverse load to be applied to the outside surface of the post 302 to reduce loading at the pivot member 501. In some embodiments, the post 302 may include a roller surface 510 that is configured to engage the roller assembly 502.

With continued reference to FIGS. 7B and 8, when the support assembly 300 is in the second configuration, the support assembly 300 may support the crane system 350. The crane system 350 may be used to remove sheeter rollers from the sheeter 400 or to perform other operations with the sheeter 400. To utilize the crane system 350, at least a portion of the feed system 200 may be removed. For example, generally the piping system 202 and the nozzle 204 are removed before the crane system 350 can be mounted to the support assembly 300. The crane system 350 can be removably coupled to the transverse support 304 at a crane mount 342. The crane mount 342 can extend between the first arm 316 and the second arm 318 near the first end 305. The crane system 350 can include a motor 352, a drum 354, and a cable 356. The crane system 350 can also include the pulley 358 and the axle 360 (see e.g., FIG. 9). The motor 352 is coupled with the drum 354 and is configured to rotate the drum 354 to spool and unspool the cable 356. The cable 356 extends from the drum 354 and can be routed over the pulley 358 when the crane system 350 is in an operational configuration (e.g., when components of the feed system 200 are removed and the cable 356 extends between the drum 354 and the pulley 358). The pulley 358 rotates about the axle 360. In operation, the crane system 350 is configured to support the weight of the sheeter rollers during a removal or insertion process.

Figure 11:
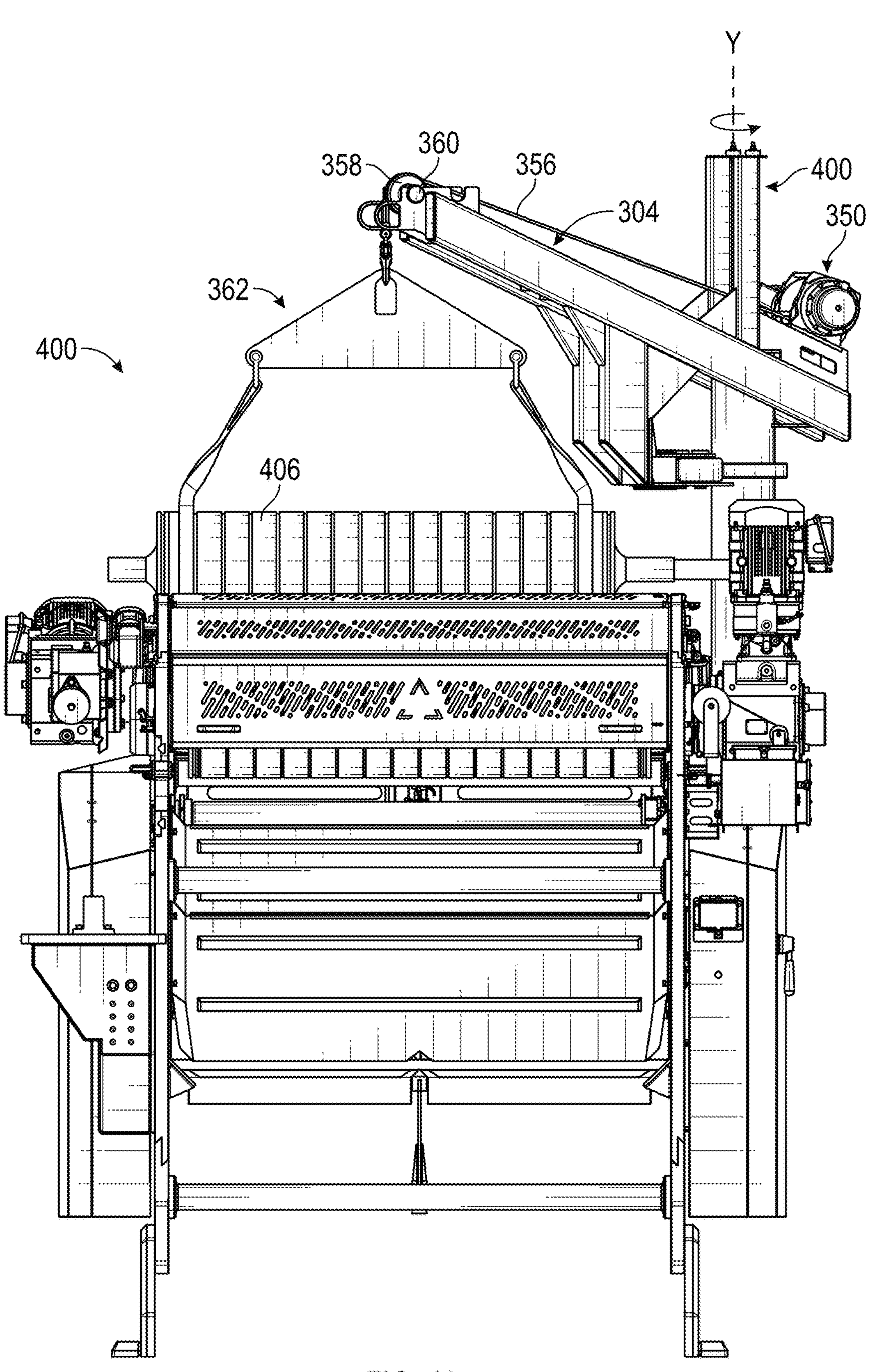
FIG. 11 illustrates the support assembly comprising a crane assembly being used to remove a sheeter roller from the sheeter of FIG. 2B.

FIG. 11 illustrates the support assembly 300 being used to remove a roller 406 from the sheeter 400. To remove the roller 406, the cable 356 of the crane system 350 may be coupled to a lifting sling 362 which supports the roller 406. The motor 352 may then be used to spool the cable 356 to vertically lift the roller 406 out of the sheeter 400. Once the roller 406 is clear of an upper portion of the sheeter 400, the support assembly 300 may be rotated about the vertical axis Y using the pivotable assembly 500 to move from the first angular position to a different angular position. Such rotation is illustrated in FIG. 11 by the arrow over the lateral side of the sheeter. The roller 406 that has been lifted can then be disconnected from the support assembly 300 and serviced or a replacement roller can be attached to the support assembly 300 and inserted in the sheeter 400.

Including the crane system 350 in the support assembly 300 may provide certain benefits. For example, by including the crane system 350 in the support assembly 300, a separate crane is not required to remove the rollers of the sheeter 400. As the rollers of the sheeter 400 may be replaced one or more times a year, an easily accessible crane system 350 allows the rollers of the sheeter 400 to be removed at will without bringing in a separate crane system. When the rollers are not set to be removed, the crane system 350 may be in a non-operational configuration with the cable 356 removed from the crane system 350 or simply wound around the drum 354 for storage. The crane system 350 can be removed from the support assembly 300 for storage and the support assembly can be placed back in the first configuration by mounting the feed system 200 to the support assembly 300 for normal sheeter operations.

FIG. 10 illustrates how the feed system 200 and support assembly 300 can move between positions. In FIG. 10, the support assembly 300 is shown in the first configuration with the feed system 200; however, it is recognized that the support assembly 300 can move between different positions when in the second configuration with the crane system 350. As shown in FIG. 10, the feed system 200 can be in the first position in which the nozzle 204 has a first angular position relative to the vertical axis Y. In the first position, the nozzle 204 may be disposed over the sheeter 400. In this configuration, the nozzle 204 can deliver the feed of masa from the masa source system 100 to the sheeter 400 for processing. When it is time to evacuate the feed system 200, the feed system 200 can be rotated about the vertical axis Y via the pivotable assembly 500 to the second position. In the second position, the nozzle 204 has a second angular position relative to the vertical axis Y. In the second position, the nozzle 204 is disposed away from the sheeter 400. Optionally, the nozzle 204 may be disposed over the containers 140 if, for example, an evacuation is desired. In some examples, the first angular position may be approximately 180 degrees offset from the second angular position relative to the vertical axis Y. In some configurations, the first angular position may be between 90 degrees and 180 degrees (e.g., 90 degrees and 180 degrees, 120 degrees and 180 degrees, 150 degrees and 180 degrees, values between the foregoing, etc.) offset from the second angular position relative to the vertical axis Y. By allowing the feed system 200 to move between the two configurations, the feed system 200 can be evacuated without requiring the sheeter 400 to be moved, as explained above. This configuration may provide benefits of allowing for faster evacuation procedures and reducing the risk of injury associated with moving the sheeter 400 and evacuating the feed system 200.

Additional Embodiments

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include these features, elements and/or states.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

Additionally, features described in connection with one embodiment can be incorporated into another of the disclosed embodiments, even if not expressly discussed herein, and embodiments having the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this description is not, and should not be taken as, an acknowledgement or any form of suggestion that that prior art forms part of the common general knowledge in the field of endeavor in any country in the world.

The invention may also be said broadly to consist in the parts, elements and features referred to or indicated in the description of the application, individually or collectively, in any or all combinations of two or more of said parts, elements or features.

Where, in the foregoing description, reference has been made to integers or components having known equivalents thereof, those integers are herein incorporated as if individually set forth. In addition, where the term "substantially" or any of its variants have been used as a word of approximation adjacent to a numerical value or range, it is intended to provide sufficient flexibility in the adjacent numerical value or range that encompasses standard manufacturing tolerances and/or rounding to the next significant figure, whichever is greater.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims.

The invention claimed is:

1. A masa processing system, comprising:

a nozzle configured to output a feed of masa into a sheeter;

a piping system comprising a conduit configured to be coupled to a source of the feed of masa and to convey the feed of masa to the nozzle; and a support assembly comprising:

a post having a lower fixed end and an upper end; and a transverse support having a first end pivotably coupled with the post and a second end opposite the first end, the second end being configured to be disposed above and transversely offset from the first end, the transverse support being coupled with the conduit of the piping system over the nozzle, wherein the support assembly has a first configuration in which the nozzle is disposed at a first angular position relative to a vertical axis and positioned over the sheeter and a second configuration in which the transverse support is rotated about the vertical axis relative to the first angular position to position the nozzle in a second angular position offset from the first angular position and disposed away from the sheeter.

2. The masa processing system of claim 1, wherein the sheeter comprises one or more sheeter rollers configured to form the feed of masa into a sheet for generating pre-cooked masa units.

3. The masa processing system of claim 1, wherein the piping system comprises a first span of conduit having an opening centered on the vertical axis such that as the support assembly moves from the first angular position to the second angular position, the first span of conduit rotates about the center of the opening.

4. The masa processing system of claim 3, wherein a rotation interface is provided at the opening of the first span between the piping system and a fixed conduit of a source of masa providing the feed of masa.

5. The masa processing system of claim 4, wherein the rotation interface comprises a food grade seal configured to prevent leakage between the first span of conduit and the fixed conduit of the source of masa providing the feed of masa.

6. The masa processing system of claim 1, wherein the transverse support further comprises a seat coupled with the piping system and configured to support the piping system.

7. The masa processing system of claim 1, wherein the transverse support comprises a tool engagement feature configured for connecting a tool for applying a torque to the support assembly to move the support assembly between the first angular position and the second angular position.

8. The masa processing system of claim 1, wherein the support assembly further comprises a pivotable assembly coupled with the upper end of the post, the pivotable assembly comprising a pivot member rotatably coupled with the post and being pivotable about the vertical axis.

9. The masa processing system of claim 8, wherein the transverse support further comprises a first arm and a second arm, each of the first arm and the second arm coupled with the pivot member at one end, the first arm and the second arm coupled with each other at one or more positions away from the one end.

10. The masa processing system of claim 8, wherein the pivotable assembly further comprises one or more rollers configured to roll over a surface of the post to guide movement between the first angular position and the second angular position.

11. The masa processing system of claim 1, wherein the support assembly further comprises a motor coupled with a drum to rotate the drum to spool and unspool a cable routed over a pulley at the second end of the transverse support, the cable configured to support a weight of one or more sheeter rollers of the sheeter when lifted from within the sheeter.

12. The masa processing system of claim 11, wherein the transverse support comprises a first arm and a second arm, the pulley being supported on an axle supported on one end by the first arm and on another end by the second arm.

13. The masa processing system of claim 12, further comprising a first bracket coupled with the first arm and a second bracket coupled with the second arm, the first bracket and the second bracket each comprising two positions for mounting the pulley.

* * * * *